United States Patent Office 2,796,728
Patented June 25, 1957

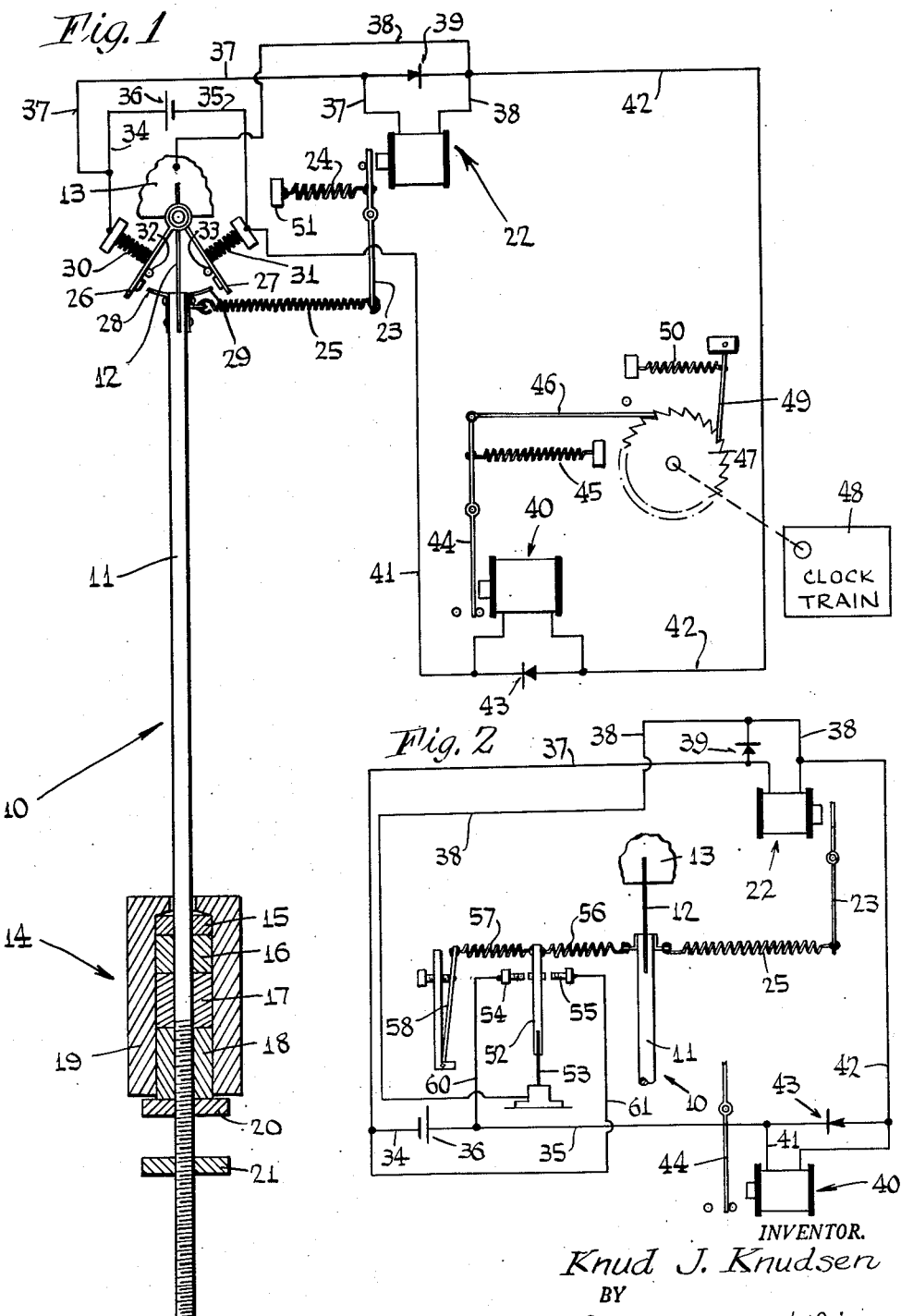

2,796,728

PRECISION CHRONOMETER

Knud J. Knudsen, Woodbury, Conn.

Application July 28, 1953, Serial No. 370,679

9 Claims. (Cl. 58—30)

This invention relates to precision clocks or chronometers.

An object of the invention is to provide an improved precision chronometer which is extremely accurate and at the same time relatively simple in construction.

Another object of the invention is to provide an improved precision chronometer as above, which has relatively few component parts, and which may be easily and economically fabricated.

A further object of the invention is to provide an improved precision chronometer in accordance with the foregoing, which will operate for an extended period of time without requiring attention or replenishment of the motive means.

Yet another object of the invention is to provide an improved electrically-powered precision chronometer as above characterized, which requires but very little power so that small and inexpensive battery cells may be utilized, and so that these cells will have a greatly prolonged life.

A feature of the invention is the provision of an improved precision chronometer as above set forth in which adjustment may be easily and quickly effected, and in which a simple means is provided to compensate for fluctuations of ambient temperature.

Yet another object of the invention is to provide an improved precision chronometer, in which friction which might affect the timing is wholly eliminated.

Other features and advantages will hereinafter appear.

In the accompanying drawings:

Figure 1 is a diagrammatic showing of a precision chronometer made in accordance with the invention.

Fig. 2 is a fragmentary diagrammatic showing of a chronometer illustrating a modification of the invention.

The chronometer shown in Fig. 1 comprises a pendulum 10 formed of an elongate bar 11 carried solely by a leaf spring 12 secured to a support 13, said bar having at its lower end a weight 14. By the present invention, novel and simple means to compensate for changes of ambient temperature is provided, by forming the bar 11 of a low expansion metal such as Nilvar, and by providing in the weight 14 spacing washers 15, 16, 17 and 18 of relatively high expansion metal. The weight 14 further comprises a shell or sleeve 19 and regulator nuts 20 and 21 which are threaded on the bar 11. The shell 19 may, for example, be steel and the spacing washers 15—18 may be of iron or aluminum. With any rise in temperature, the bar 11 of the pendulum will elongate slightly and at the same time the washers 15—18 will become thicker, raising the shell 19 with respect to the nut 20 and compensating for the lengthening of the bar 11. The second adjustment provided by the nut 21 is in the nature of a vernier in that it enables an extremely fine variation of the period of the pendulum to be had.

In accordance with the present invention I also provide a novel motive means for swinging the pendulum 10 and for actuating a time indicator mechanism in response to the oscillation of the pendulum, such means being devoid of friction where the presence of such friction would impair the accuracy of the chronometer. This motive means is of extremely simple construction, is reliable in use and requires practically no attention, operating on an extremely small amount of power from small battery cells which therefore have extremely long life.

For example, the total power utilized by my improved motive means is on the order of one milliwatt, and the power required by the pendulum would amount to one kilowatt hour in a period of one million years.

The motive means of this invention consists of two distinct parts, one to impart power to the pendulum and the other to drive a time indicator mechanism in response to oscillation of the pendulum. As shown in Fig. 1, the pendulum-driving means comprises an electro-magnet 22 having an armature 23 normally biased away from the electro-magnet by a coil spring 24. The armature 23 has connected to it a second coil spring 25 in opposition to and weaker than the coil spring 24, the spring 25 being connected with the upper extremity of the pendulum bar 11.

Energization of the magnet 22 attracts the armature 23 and relieves some of the tension in the spring 25, and deenergization of the magnet 22 releases the armature 23 enabling the biasing spring 24 to increase the tension in the spring 25. After the magnet 22 has been energized, even an appreciable reduction of its energization will not release the armature 23, and the purpose of this will be later brought out.

The support 13 for the pendulum 10 carries on small, negligible-friction pivots a pair of contact arms 26 and 27 engageable with contacts 28 and 29 respectively on the upper extremity of the pendulum bar 11. The contact arms 26 and 27 are held by means of springs 30 and 31 respectively against stops 32 and 33, and when the pendulum 10 oscillates the contacts 28 and 29 will momentarily engage the arms 26 and 27 and may dislodge the latter briefly from the stops 32 and 33.

The contact arms 26 and 27 are connected by wires 34 and 35 with a battery 36, and a wire 37 leads from the wire 34 to the magnet 22, the latter being connected by a wire 38 with the pendulum contacts 28 and 29. A rectifier 39 is connected across the wires 37 and 38 to reduce contact sparking.

The motive means for the time indicator mechanism comprises a magnet 40 connected by a wire 41 to the stationary contact 27, and by a wire 42 to the wire 38. A rectifier 43 connected between the wires 41 and 42 minimizes arcing of the contacts.

The magnet 40 has an armature 44 biased by a spring 45 and connected to a pawl 46 engaging a ratchet wheel 47 which is shown as driving a clock-train 48 having the usual time indicators such as drums or hands. A back check 49 biased by a spring 50 engages the ratchet wheel 47 to prevent retrograde movement of the wheel. Energization of the magnet 40 from the battery 36 will attract the armature 44 in spite of the restraint of the spring 45, and a substantial reduction of such energization will not result in release of the armature 44.

Operation of the chronometer of Fig. 1 is as follows:

With the pendulum contacts disengaged, the magnets 22 and 40 and the battery 36 will all be in series. If the pendulum is given an initial swing to the left it will cause the contacts 26 and 28 to become engaged. This will short-circuit the magnet 22, resulting in full energization of the magnet 40, retracting the pawl 46 as shown. The force of gravity, plus the pull of the spring 25 will swing the pendulum to the right, and during this swing the magnet 40 will continue to hold the armature 44 even though it is only partly magnetized due to cessation of the short-circuit of the magnet 22. As the pendulum 10 is swinging to the right engages the contacts 29 and 27 the magnet 40 will be short-circuited, releasing the armature 44 and enabling the spring 45 to advance the ratchet wheel 47 by one tooth.

The short-circuit of the magnet 40 will also cause full energization of the magnet 22, attracting the armature 23 against the action of the spring 24 and relieving the tension of the spring 25. The pendulum 11 will now swing fully to the left because of gravity and the released tension in the spring 25, and during such swing the armature 23 will not be released by the magnet 22, even though the latter is only partially energized by virtue of its being in series with the magnet 40. When the contacts 26 and 28 again close, the magnet 22 will be short-circuited and the armature 23 released, enabling the spring 24 to reestablish a greater tension in the pendulum spring 25. Oscillation of the pendulum 10 will continue and the clock-train 48 will be operated in step with the period of the pendulum.

I provide rigid or solid connections between the ends of the springs 24 and 25 and the armature 23, pendulum bar 11 and anchorage 51 for the spring 24. I also provide rigid connections between the contact arms 26, 27 and the ends of the springs 30, 31, and between the springs 30, 31 and their anchorages, and by this construction in conjunction with the leaf spring suspension 12 of the pendulum and the non-sliding engagement between the contacts 26, 28 and 27, 29 there is no appreciable friction in the parts of the system which might have any effect on the period of the pendulum 10.

Variations in the voltage in the battery 36 will not affect the chronometer, within wide limits, since the power imparted to the pendulum 10 and to the ratchet 47 is supplied by the coil springs 24 and 45 and not by the magnets 22 and 40.

By the above construction I obtain an extremely accurate and precise chronometer, one which requires very little power and will operate for extremely long periods of time on small battery cells, one which has few components of simple, reliable and economical construction, and which is simply and accurately compensated to take care of variations in ambient temperature.

A modification of the invention wherein no friction whatsoever is involved in any parts which might affect the period of the pendulum 10, is shown in Fig. 2. In this figure the pendulum bar 11 carried by the leaf spring 12 and actuated by the spring 25 and armature 23 is made to actuate switch contacts through a yieldable linkage, thereby to eliminate friction. The switch comprises a switch arm 52 mounted solely by a leaf spring 53 and engageable with stationary contacts 54 and 55. The switch arm 52 is connected to the upper extremity of the pendulum bar 11 by a coil spring 56, and connected by a second coil spring 57 to an adjustable anchorage 58. The extremities of all of the springs 25, 56 and 57 are made rigid to eliminate friction. No sliding occurs between the contacts 54, 55 and the contact arm 52 when there is engagement. The remainder of the chronometer is much the same as that already described above, except that there is eliminated a second spring connected with the magnet armature 23, and the electro-magnet 22 is made to tension the spring 25 when it is energized. The operation is otherwise similar, in general. The electro-magnets 22 and 40 are connected in series with each other and with the battery 36 by the wires 42, 38, 37, 34, 35 and 41. The switch arm 52 is connected to the common wire 42 of the electro-magnets by the wire 38. The contact 54 is connected by a wire 60 to the wire 35, and the contact 55 is connected by a wire 61 to the wire 34. With this arrangement, when the pendulum 10 in Fig. 2 swings to the left, causing engagement between the contacts 52 and 54, the electro-magnet 40 will be short-circuited, causing full energization of the electro-magnet 22 whereby the armature 23 is attracted and moved, to increase the tension of the spring 25 and pull the pendulum 10 toward the right. Energization of the electro-magnet 22 at substantially one-half its full energization is maintained after separation of the contacts 52 and 54, thereby causing the armature 23 to be retained, maintaining the increased pull of the spring 25. When the pendulum 10 attains the end of the stroke to the right, the contacts 52 and 55 will be engaged, short-circuiting the electro-magnet 22 and releasing the armature 23 under the action of the spring 25. At the same time the electro-magnet 40 will be energized. The reduced tension in the spring 25 will now permit the pendulum 10 to again swing to the left, thereby setting up an oscillation of the pendulum.

The intermittent energization of the electro-magnet 40 will result in advance of the timing ratchet wheel 47 as already explained above. The components which have to do with the period of the pendulum 10 are all devoid of friction where such friction might affect said period, and since variations in the voltage of the source of potential, within wide limits, will not affect the proper functioning of the clock, the accuracy will be of a very high order.

In connection with any variations which might occur in the voltage of the battery 36, it will be understood that the battery voltage may vary a substantial amount without altering the functioning of the electro-magnets 22 and 40 since the armatures of said magnets operate even at reduced voltages, and move between fixed stops as distinguished from magnets which might be made to act directly on the pendulum 10 to impart a pull thereto, without the intermediary of spring linkages, such as the spring 25. By the above organization, reduced voltage of the battery 36 would still result in full actuation of the armatures 23 and 44, and therefore the effect of such reduced voltage on the clock train and the period of the pendulum would be nil.

Variations and modifications may be made within the scope of the claims and portions of the improvements may be used without others.

I claim:

1. A precision chronometer comprising a pendulum; means for oscillating the pendulum, including a spring having one end portion connected to the pendulum and an electro-magnet whose energization is controlled by the pendulum, having an armature connected to the other end portion of the spring for varying the effective length of the spring for altering the tension thereof, the connections between the spring and the armature and pendulum being rigid and devoid of friction; and a spring providing the sole support of the pendulum.

2. A precision chronometer comprising a pendulum; means for oscillating the pendulum, including a first spring connected to the pendulum and an electro-magnet whose energization is controlled by the pendulum, having an armature connected to the spring for altering the tension thereof; a second spring connected to the pendulum and opposing said first spring; and a contact actuated by the second spring, controlling the energization of the electro-magnet.

3. A precision chronometer comprising a pendulum; a resilient mechanical linkage means made operative when the pendulum swings a predetermined distance from center in one direction, applying a force to the pendulum opposing said swing, said means being rendered inoperative only when the pendulum completes a swing a predetermined distance from center in the other direction and said force being sufficient to cause the pendulum to swing through at least the total of said distances; and means controlled by the swinging of the pendulum, for indicating time.

4. A precision chronometer comprising a pendulum; means made operative when the pendulum swings a predetermined distance from center in one direction, applying a force to the pendulum opposing said swing, said means being rendered inoperative only when the pendulum swings a predetermined distance from center in the other direction and said force being sufficient to cause the pendulum to swing through at least the total of said distances; and means controlled by the swinging of the pendulum, for indicating time, both said means including a source of potential, including electro-magnetic mechanisms having electro-magnets continuously partially energized from said source except at the ends of the strokes of the pendulum, and including means operated by the pendulum for causing the energization of the magnets to be increased respectively only at the ends of the forward and backward strokes of the pendulum.

5. The invention as defined in claim 4 in which the electro-magnets and source of potential are permanently connected in a circuit in series with each other.

6. The invention as defined in claim 5 in which the means causing increase of energization includes switches actuated by the pendulum, bridging the said electro-magnets.

7. A precision chronometer comprising a pendulum freely mounted for oscillation; means for imparting energy to said pendulum for maintaining the oscillation, said means including an electrical switch; and a yieldable linkage connecting the pendulum to the switch to provide for actuation of the latter by the pendulum in which there is a spring providing the sole mounting of the pendulum, in which the switch comprises a movable member and a spring providing the sole mounting of the member, in which the yieldable linkage comprises a linking spring connected with the pendulum and the movable switch member, and in which the connections between the linking spring, pendulum and movable switch member are rigid and devoid of friction.

8. A precision chronometer comprising a pendulum freely mounted for oscillation; means for imparting energy to said pendulum for maintaining the oscillation, said means including an electrical switch; and a yieldable linkage connecting the pendulum to the switch to provide for actuation of the latter by the pendulum, in which there is a spring connected to the switch and opposing the action of said yieldable linkage, said linkage also comprising a spring and the connections of all of the springs being rigid and devoid of friction.

9. A precision chronometer comprising a pendulum; means for oscillating the pendulum, including a spring having one end portion connected to the pendulum and an electromagnet whose energization is controlled by the pendulum, having an armature connected to the other end portion of the spring for varying the effective length of the spring, thereby altering the tension thereof; and a second spring connected to the armature, opposing the pull of the electromagnet, said pendulum-connected spring opposing and being weaker than the second spring; a spring providing the sole support of the pendulum; and in which the connections to all of the springs are rigid and devoid of friction.

References Cited in the file of this patent

UNITED STATES PATENTS

| 754,397 | Tiffany | Mar. 8, 1904 |
| 1,483,814 | Juruick | Feb. 12, 1924 |
| 1,731,808 | Barnes | Oct. 15, 1929 |
| 1,798,922 | Ytterberg | Mar. 31, 1931 |
| 1,965,104 | Kohlhagen | July 3, 1934 |
| 2,031,076 | Shattuck et al. | Feb. 18, 1936 |
| 2,200,064 | James | May 7, 1940 |
| 2,323,796 | Cole | July 6, 1943 |
| 2,402,111 | Engler | June 11, 1946 |

FOREIGN PATENTS

| 198,426 | Germany | May 15, 1908 |
| 594,884 | Great Britain | Nov. 21, 1947 |
| 602,006 | Germany | Aug. 29, 1934 |
| 649,005 | France | Aug. 21, 1928 |
| 750,408 | Germany | Dec. 21, 1944 |